United States Patent [19]

Rogozhin et al.

[11] 4,167,590
[45] Sep. 11, 1979

[54] METHOD FOR PRODUCING PROTEIN JELLIES FROM FISHES AND CRUSTACEANS

[76] Inventors: Sergei V. Rogozhin, ulitsa Vavilova, 55/5, kv. 20; Efim S. Vainerman, ulitsa Profsojuznaya, 94/20, kv. 53; Ljubov M. Burmistrova, ulitsa Preobrazhensky val, 16, kv. 44, all of Moscow, U.S.S.R.

[21] Appl. No.: 854,236

[22] Filed: Nov. 23, 1977

[30] Foreign Application Priority Data

Nov. 23, 1976 [SU] U.S.S.R. .............................. 2423838

[51] Int. Cl.$^2$ ............................................... A23J 1/04
[52] U.S. Cl. ................................... 426/574; 426/802; 426/657; 426/104; 426/524
[58] Field of Search ............... 426/574, 657, 802, 524, 426/104

[56] References Cited

U.S. PATENT DOCUMENTS

| | | | |
|---|---|---|---|
| 3,801,713 | 4/1974 | Tolstoguzov et al. | 426/802 |
| 3,920,853 | 11/1975 | Middendorf et al. | 426/574 |
| 3,922,359 | 11/1975 | Hashizume et al. | 426/574 |
| 3,922,372 | 11/1975 | Hasegawa | 426/574 |
| 3,993,794 | 11/1976 | Bernardin | 426/574 |
| 4,001,459 | 1/1977 | Ki Kim et al. | 426/802 |

*Primary Examiner*—Jeanette M. Hunter
*Attorney, Agent, or Firm*—Steinberg & Blake

[57] ABSTRACT

Producing protein jellies from fishes and crustaceans by separating myofibrillar protein from fishes and crustaceans, and subjecting the resulting protein-water system, comprising from 5 to 50% by weight of said protein, to cooling to crystallize the system after which it is defrosted. Said system may contain animal or vegetable protein, lipids, carbohydrates or salts. The jelly produced retains the shape imparted thereto and is resistant to various kinds of treatment, for example, boiling and roasting.

5 Claims, No Drawings

METHOD FOR PRODUCING PROTEIN JELLIES FROM FISHES AND CRUSTACEANS

FIELD OF APPLICATION

The present invention relates to methods for producing protein jellies, and more particularly, to a method for producing jellies from proteins of fishes and crustaceans. Said jellies are used in the food industry as ready-to-serve foodstuffs.

As is known, jellies are multi-component systems which are characterized by two basic features, namely, high reversible deformation and practically non-existent fluidity. In the cae of proteins as well as other high-molecular compounds, the process of formation of jelly resides in the appearance of bonds between macromolecules which exist in solution as relatively independent kinetic units.

BACKGROUND OF THE INVENTION

Known in the art is a number of methods for producing protein jellies based on changes in the temperature of protein solutions or on addition of special reactants thereto. For example, gelatine jellies are prepared by cooling its solutions to a temperature of 20° to 30° C. (A.Veis, The Macromolecular Chemistry of Gelatin, 1964, London).

Casein jellies are prepared by treating a concentrated solution of casein with a pH of less than 11.5, with divalent cations (M. Tidney, H. Higgins, J. Hayss, Nature, Vol. 167, 224, 1951). Known in the art is a method for producing casein jellies which consists in precipitating casein from solution by any soluble salt of calcium at a pH of 6.5, and producing a 25% suspension which is heated to a temperature of 120° to 125° C. (U.S. Pat. No. 2,813,794, Nov. 19, 1967).

Known in the art is a method for producing ovalbumin which consists in addition to a protein solution of acetic acid (W. G. Myers. W. G. Franec, J.Phys.Chem., vol.44, 1113, 1940) or an alkali (S. Z. Ponnely, Kolloid-Z, vol.77, 343, 1936), as well as different salts and alcohols (B. Jirgensons, Kolloid-Z, vol. 74,300,1936).

Said methods for the preparation of jellies cannot be applied to the preparation of myofibrillar proteins of fishes and crustaceans. However, the use of protein resources of the oceans of the world is at present a pressing problem whose solution is of great practical importance.

OBJECT OF THE INVENTION

It is an object of the present invention to use proteins of fishes and crustaceans and to provide a method for preparing protein jellies therefrom.

BRIEF DISCLOSURE OF THE INVENTION

The method for producing protein jellies from fishes and crustaceans, according to the invention, is characterized in subjecting the myofibrillar protein-water system comprising from 5 to 50% by weight of said protein to cooling to crystallize the system after which it is defrosted.

According to the invention, various gustatory and technological additives may be introduced in said system, for example, lipids, animal or vegetable proteins, or carbohydrates in an amount of up to 50% of the mass of the myofibrillar protein, as well as salts in an amount of up to 20% of the mass of said protein.

The invention makes it possible to use protein of fishes and crustaceans. The method can be easily applied in industry since it is based on a simple and accessible technology, namely, freezing and defrosting, and does not require special reactants. The invention makes it possible to prepare isotropic and anisotropic jellies which retain the shape of the vessel in which freezing is carried out. The jellies produced are resistant to various kinds of treatment.

DETAILED DESCRIPTION OF THE INVENTION

The myofibrillar protein of fishes or crustaceans in the form of water suspension with a concentration of 5 to 50% is placed in a vessel of any shape and subjected to cooling to crystallization, i.e. freezing. As pointed out above, to produce a protein jelly from fishes and crustaceans a myofibrillar protein-water system is used, wherein the content of said protein is from 5 to 50% by weight. A change in said range does not produce the desired result. Thus, if the content of the myofibrillar protein in the system is less than 5% by weight, the jelly does not form, and if the content of protein is over 50% by weight the structure of jelly formation is upset and the jelly is of an inferior quality.

The freezing can be effected by different methods in a wide range of below zero temperatures, for example, from 0° C. to −100° C. In a crystalline state the jelly can be kept for a long time without losing its properties. The jelly can be prepared with different additives such as lipids, carbohydrates, and salts in said concentrations.

After crystallization the protein-water system is defrosted. The defrosting can be carried out in a wide range of above zero temperatures. The resultant jelly-like product is easy to separate from the vessel and can be later subjected to various kinds of treatment including boiling, roasting, etc.

For a better understanding of the present invention examples are presented below.

EXAMPLE 1

An aqueous suspension of myofibrillar proteins of kriel produced by alkaline extraction of kriel, with a concentration of protein of 5% by weight, is frozen in a cylindrical vessel with a diameter of 33 mm and a height of 900 mm at a temperature of −10° C. In 12 hours the content of the vessel is defrosted at room temperature to produce a jelly-like product retaining the shape of the vessel and having a fine-pored fibrous structure.

EXAMPLE 2

The jelly is prepared as in Example 1, except that an aqueous suspension of protein of kriel is used with a concentration of 30% by weight, to prepare a product identical with that described in Example 1.

EXAMPLE 3

The jelly is prepared in the same manner as in Example 1, except that the freezing is conducted in a tapered vessel at a temperature of −35° C. The product prepared is the same as in Example 1.

EXAMPLE 4

The jelly is produced as in Example 1, except that NaCl is added to the protein-water system in an amount of 20% of the weight of protein.

The product obtained is the same as in Example 1.

EXAMPLE 5

The jelly is produced as in Example 1, except that casein is added to the protein-water system in an amount of 50% of the weight of protein of kriel. The jelly-like product obtained has a fine-pored structure.

EXAMPLE 6

The jelly is produced as in Example 1, except that sunflower oil in an amount of 50% of the weight of protein is added to the aqueous suspension of proteins of kriel with a concentration of protein of 12% by weight.

The product obtained is the same as in Example 1.

EXAMPLE 7

The jelly is prepared as in Example 1, except that starch is added to the protein-water system in an amount of 50% of the weight of protein. The product obtained has a fine-pored fibrous structure.

EXAMPLE 8

An aqueous suspension of myofibrillar proteins of cod which are obtained by alkaline extraction of the fish with a concentration of protein of 10%, is frozen in a cylindrical vessel at −20° C. In 2 hours the content of the vessel is defrosted in warm water (+40° C.). The product obtained is easy to separate from the vessel, it retains the shape of the vessel and has a fine-pored fibrous structure.

What is claimed is:

1. Method of producing protein jellies from myofibrillar protein of fishes and crustaceans, which consisting essentially of freezing an aqueous suspension of the myofibrillar protein of fishes or crustaceans, said aqueous suspension containing 5 to 50% by weight of said protein, and then defrosting the thus formed frozen suspension, thereby obtaining a shape-retaining jelly of said myofibrillar protein and water.

2. The method of claim 1, and wherein the aqueous suspension of said myofibrillar protein includes animal or vegatable proteins in an amount of up to 50% of the weight of said myofibrillar protein.

3. The method of claim 1, and wherein the aqueous suspension of said myofibrillar protein includes lipids in an amount of up to 50% of the weight of said myofibrillar protein.

4. The method of claim 1, and wherein the aqueous suspension of said myofibrillar protein includes carbohydrates in an amount of up to 50% of the weight of said myofibrillar protein.

5. The method of claim 1, and wherein the aqueous suspension of said myofibrillar protein includes sodium chloride in an amount of up to 20% of the weight of said myofibrillar protein.

* * * * *